(12) United States Patent
Rho

(10) Patent No.: US 7,675,580 B2
(45) Date of Patent: Mar. 9, 2010

(54) LIQUID CRYSTAL DISPLAY WITH BUILT-IN TOUCH SCREEN HAVING PARTICLES FOR PRESSURE CONCENTRATION

(75) Inventor: Soo Guy Rho, Suwon-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 160 days.

(21) Appl. No.: 11/745,284

(22) Filed: May 7, 2007

(65) Prior Publication Data

US 2007/0262967 A1    Nov. 15, 2007

(30) Foreign Application Priority Data

May 10, 2006   (KR) ................. 10-2006-0041786

(51) Int. Cl.
  *G02F 1/1335* (2006.01)
  *G06F 3/045* (2006.01)
(52) U.S. Cl. .................. 349/12; 345/174; 345/173
(58) Field of Classification Search ............... 345/174; 178/18.01, 18.03, 18.05; 349/12
  See application file for complete search history.

(56) References Cited

U.S. PATENT DOCUMENTS

| | | | |
|---|---|---|---|
| 6,023,316 A * | 2/2000 | Yano | 349/112 |
| 6,501,529 B1 * | 12/2002 | Kurihara et al. | 349/160 |
| 2006/0028603 A1 * | 2/2006 | Lee et al. | 349/141 |
| 2006/0092142 A1 * | 5/2006 | Gillespie et al. | 345/173 |
| 2006/0262100 A1 * | 11/2006 | Van Berkel | 345/173 |

* cited by examiner

*Primary Examiner*—Andrew Schechter
*Assistant Examiner*—Michael Inadomi
(74) *Attorney, Agent, or Firm*—Innovation Counsel LLP

(57) ABSTRACT

The present invention relates to a liquid crystal display (LCD) panel with a built-in touch screen capable of maintaining touch sensitivity at a certain level regardless of touch circumstances, and an LCD having the LCD panel with a built-in touch screen. According to the present invention, there are provided an LCD panel with a built-in touch screen, comprising a first substrate; a second substrate positioned opposite to first substrate; a liquid crystal layer injected between first and second substrates; a sensing unit including a conductive column spacer and a conductive pad spaced apart from conductive column spacer by a predetermined interval to sense a touch point; and a plurality of pressure particles with certain hardness positioned on an outer surface of first substrate. Further, there is provided an LCD having the LCD panel with a built-in touch screen.

20 Claims, 8 Drawing Sheets

LIQUID CRYSTAL DISPLAY WITH BUILT-IN TOUCH SCREEN HAVING PARTICLES FOR PRESSURE CONCENTRATION

REFERENCE TO RELATED APPLICATION

The present application claims the benefit of priority of Korean Patent Application No. 10-2006-0041786 filed on May 10, 2006 in the Korean Intellectual Property Office.

FIELD OF THE INVENTION

The present invention relates to a liquid crystal display panel having a built-in touch screen and a liquid crystal display (LCD) having the same.

DESCRIPTION OF THE RELATED ART

FIG. 1 is a schematic sectional view of a conventional LCD panel with a built-in touch screen having a color filter substrate 10 including a plurality of color filters 13, a thin film transistor (TFT) substrate 20 including a plurality of pixels 26, a liquid crystal layer 30 between color filter substrate 10 and TFT substrate 20, and polarizing plates 41 and 42 attached to the outer surfaces of the substrates. A sensing unit which is composed of a conductive column spacer 17 and a pad 27 spaced apart from conductive column spacer 17 by a predetermined interval is formed between the substrates to sense touch points.

The touch screen so configured induces sensing unit to operate by touching an upper substrate, i.e. color filter substrate 10. That is, if color filter substrate 10 is touched, the gap changes between conductive column spacer 17 and the pad 27 causing a detectable change in resistance at the touch point. However, in the aforementioned structure, touch sensitivity depends on touch circumstances. That is, the touch sensitivity is high when a relatively rigid bar having a relatively small contact area is used, (case 'A'), whereas the touch sensitivity is low when a relatively soft tool having a large contact area, e.g. a finger or the like, is used, (case 'B').

SUMMARY OF THE INVENTION

The present invention provides a liquid crystal display (LCD) panel with a built-in touch screen having improved touch sensitivity regardless of the characteristics of the contacting instrumentality. According to an aspect of the present invention the touch screen, comprises a first substrate; a second substrate positioned opposite to first substrate; a liquid crystal layer between first and second substrates; a sensing unit including a conductive column spacer and a conductive pad spaced apart from conductive column spacer by a predetermined interval to sense a touch point; and a plurality of pressure particles exhibiting a predetermined degree of hardness positioned on an outer surface of first substrate. The LCD panel of the present invention may further comprise first and second polarizing plates attached respectively to outer surfaces of first and second substrates.

Preferably, first substrate comprises a transparent insulative substrate, a black matrix for blocking light, a plurality of color filters, and a common electrode formed on an entire surface of the plurality of color filters, wherein conductive column spacer is formed on first substrate.

Preferably, conductive column spacer is formed on the black matrix.

Preferably, conductive column spacer is composed of a projection made of an insulative material and a conductive layer formed on the projection.

Preferably, conductive column spacer is composed of a projection made of a conductive material. Preferably, the spacer includes a ball spacer or column spacer; pressure particles is in the form of a ball; the size of pressure particles is 1 to 100 μm. Preferably, the plurality of pressure particles are dropped at positions corresponding to conductive column spacer and conductive pad and are dispersed on the outer surface of first substrate at a predetermined dispersion density.

Preferably, the plurality of pressure particle are dispersed on an adhesive layer of first polarizing plate at a predetermined dispersion density.

The LCD panel may further comprise a controller for receiving a signal from sensing unit to detect a voltage change and to create a coordinate of a touch point; and a driver for receiving the coordinate from the controller to operate a pointer.

According to another aspect of the present invention, there is provided an LCD, comprising an LCD panel with a built-in touch screen including a first substrate, a second substrate positioned opposite to first substrate, a liquid crystal layer injected between first and second substrates, a sensing unit including a conductive column spacer and a conductive pad spaced apart from conductive column spacer by a predetermined interval to sense a touch point, and a plurality of pressure particles with certain hardness positioned on an outer surface of first substrate; and a backlight for providing light to the LCD panel.

BRIEF DESCRIPTION OF THE DRAWING

The above and other objects, features and advantages of the present invention may become apparent from a reading of the ensuing description together with the drawing, in which.

DESCRIPTION OF THE INVENTION

An expression that one element such as a layer, film, region or plate is placed on or above the other element indicates not only a case where the element is placed directly on or above the other element but also a case where an additional element is interposed between the two aforementioned elements.

Hereinafter, preferred embodiments of the present invention will be described in detail with reference to the accompanying drawings.

Figure 1:
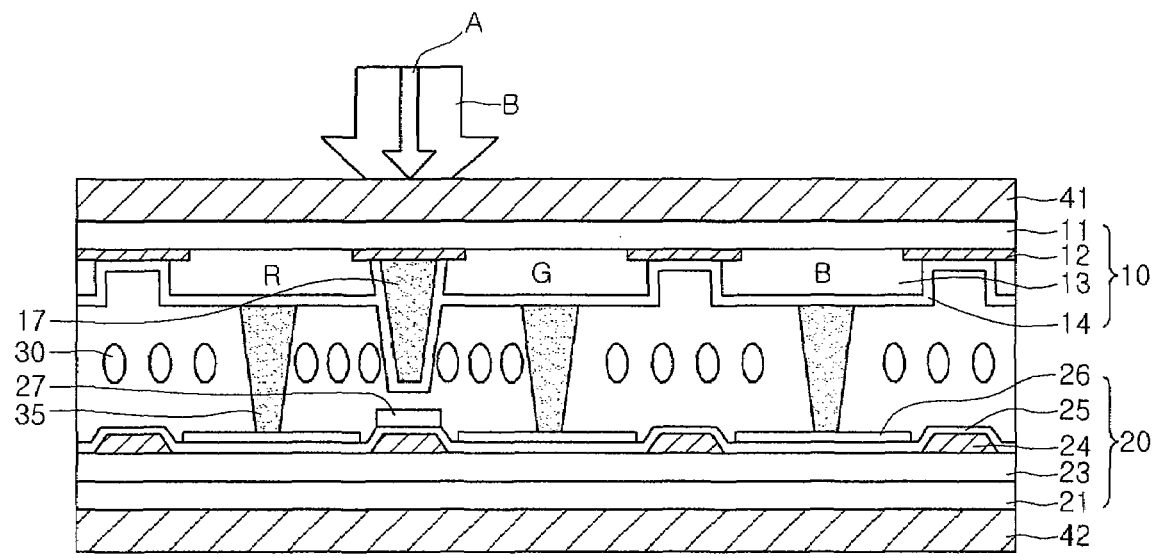
FIG. 1 is a schematic sectional view of a liquid crystal display (LCD) panel with a built-in touch screen according to a related art.
Figure 2:
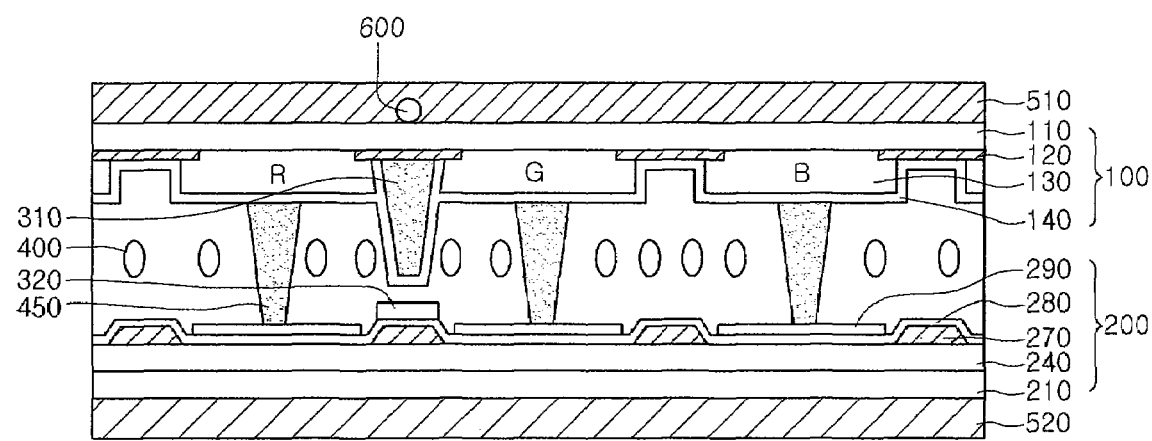
FIG. 2 is a schematic sectional view of an LCD panel with a built-in touch screen according to the present invention.

FIG. 2 is a schematic sectional view of a liquid crystal display (LCD) panel with a built-in touch screen according to the present invention.

Referring to FIG. 2, the LCD panel with a built-in touch screen comprises a color filter substrate 100, a thin film transistor (TFT) substrate 200, a sensing unit 300, a liquid crystal layer 400, a polarizing plate 500 and a pressure particle 600.

Color filter substrate 100 comprises a transparent insulative substrate 110; a black matrix 120 formed on the transparent insulative substrate 110 to block light; a plurality of red, green and blue color filters 130 formed on the transparent insulative substrate 110 and the black matrix 120; and a common electrode 140 formed on an entire surface of the plurality of color filters 130. Further, color filter substrate 100 includes a conductive column spacer 310 of sensing unit 300.

TFT substrate 200 comprises a transparent insulative substrate 210, a plurality of TFTs (not shown) formed on the transparent insulative substrate 210, and a plurality of pixel electrodes 290. Further, TFT substrate 200 includes a conductive pad 320 of sensing unit 300.

Liquid crystal layer 400 is injected between color filter substrate 100 and TFT substrate 200; first and second polarizing plates 510 and 520 are positioned on outer surfaces of color filter substrate 100 and TFT substrate 200, respectively; and a spacer 450 for maintaining a cell gap of the substrates is positioned between color filter substrate 100 and TFT substrate 200. Although a column spacer is installed in this embodiment, the present invention is not limited thereto. That is, a ball spacer may be installed.

Further, sensing unit 300 is composed of conductive column spacer 310 formed on color filter substrate 100 and conductive pad 320 formed on TFT substrate 200, and conductive column spacer 310 and conductive pad 320 are positioned at a position corresponding to each other in a state where they are spaced apart from each other by a predetermined interval. Sensing unit 300 detects the change in resistance due to the change in gap between conductive column spacer 310 and conductive pad 320 to sense touch points. That is, if a user touches a predetermined position, conductive column spacer 310 corresponding to the touched position is subjected to a force in a downward direction, i.e. in a direction toward conductive pad 320, so that conductive column spacer 310 is brought into contact with conductive pad 320. Then, if the user's touch is released, the force applied at the position is removed. Accordingly, conductive column spacer 310 and conductive pad 320 are positioned in such a state where they are spaced apart from each other by the predetermined interval. In other words, if a predetermined position is touched, the change in resistance is produced at the position while there occur short and open between conductive column spacer 310 and conductive pad 320. Accordingly, the touched position can be sensed based on the detection of the changed voltage.

Pressure particles 600 having a predetermined hardness are positioned between color filter substrate 100 and first polarizing plate 510 to perform the function of adjusting the pressure range such that the force transmitted through first polarizing plate 510 positioned at an outermost surface of color filter substrate 100 can be concentrated on a local region, i.e. a region corresponding to conductive column spacer 310. The hardness of pressure particles 600 is preferably similar to or greater than that of first polarizing plate 510 or the transparent insulative substrate 110.

In addition, pressure particles 600 may be formed into various shapes. However, they is preferably formed into a ball shape. More preferably, pressure particles 600 is formed to have a size of 1 to 100 .mu.m and made of a transparent material such as silicate. For example, pressure particles 600 may be made of a transparent glass bead. In such a case, if the size of pressure particles 600 is too small, it is difficult to concentrate the touch pressure force on the corresponding column spacer. But, if the size thereof is too large, it may have a bad influence on an image output from the LCD panel. Therefore, it is preferred that pressure particles 600 be formed to have a size of 1 to 100 .mu.m as described above.

Figure 3:
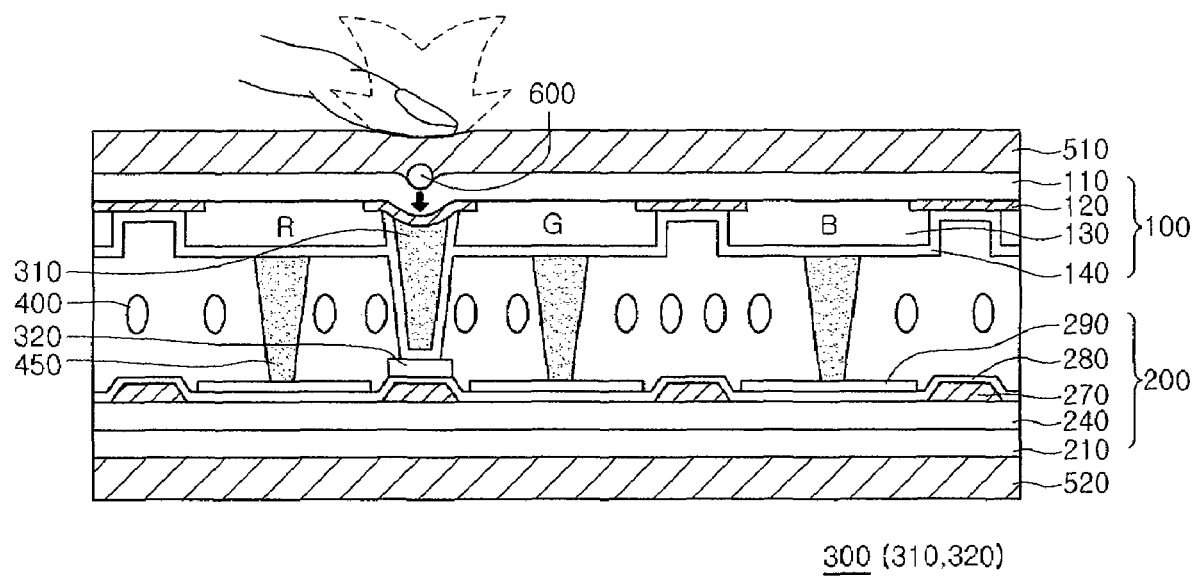
FIG. 3 is a view illustrating a finger touching an LCD panel with a built-in touch screen according to the present invention.

FIG. 3 illustrates what happens when a soft tool with a large touch area, e.g. a finger or the like, touches the LCD panel with a built-in touch screen according to the present invention. As described above, pressure particles 600 are positioned between color filter substrate 100 and first polarizing plate 510. In general, under the circumstances where a touch tool having a small contact area with the LCD panel is used, i.e. in a case where a pen-shaped bar with a small touch area and certain hardness is used, most of the touch pressure is used to change a gap between conductive column spacer 310 and conductive pad 320 of sensing unit 300. However, in a case where a soft touch tool having a large contact area with the LCD panel, i.e. a finger of the user, is used, most of the touch pressure is not used to change the gap between a conductive spacer and pad but to deform color filter substrate. Therefore, much larger touch pressure is necessary to sufficiently produce the change in gap between conductive column spacer 310 and conductive pad 320.

On the other hand, if the LCD panel with a built-in touch screen according to the present invention, in which pressure particles 600 are disposed between color filter substrate 100 and first polarizing plate 510, is touched with a user's finger or the like, an application range of touch pressure is concentrated on a local region, i.e. a region of conductive column spacer 310, by means of pressure particles 600. As a result, even though a soft touch tool having a large contact area with the LCD panel is used to touch the screen, an effect that is substantially the same is achieved as when a hard touch tool having a small contact area with the LCD panel is used.

Figure 4:
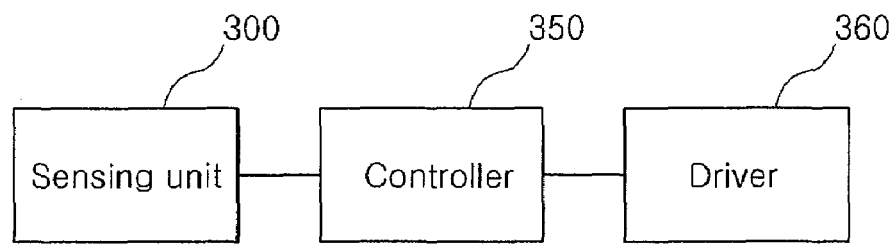
FIG. 4 is a block diagram schematically illustrating functions of a touch screen of the LCD panel with a built-in touch screen according to the present invention.

FIG. 4 is a block diagram schematically illustrating functions of a touch screen of the LCD panel according to the present invention.

Referring to FIG. 4, the touch screen comprises a sensing unit 300, a controller 350 and a driver 360. As described above, sensing unit 300 is composed of conductive column spacer 310 formed on color filter substrate 100 and conductive pad 320 formed on TFT substrate 200 to detect the change in resistance, and thus in voltage, due to the change in gap between conductive column spacer 310 and conductive pad 320.

The controller 350 receives a signal from sensing unit 300 to detect the change in voltage and then to create a desired coordinate corresponding to the received signal. The coordinate created by the controller 350 is transmitted to the driver 360, and the driver 360 receives the coordinate and operates a pointer.

The controller 350 and the driver 360 may be mounted to one side of the LCD panel or on a circuit board electrically connected to the LCD panel.

Figure 5:
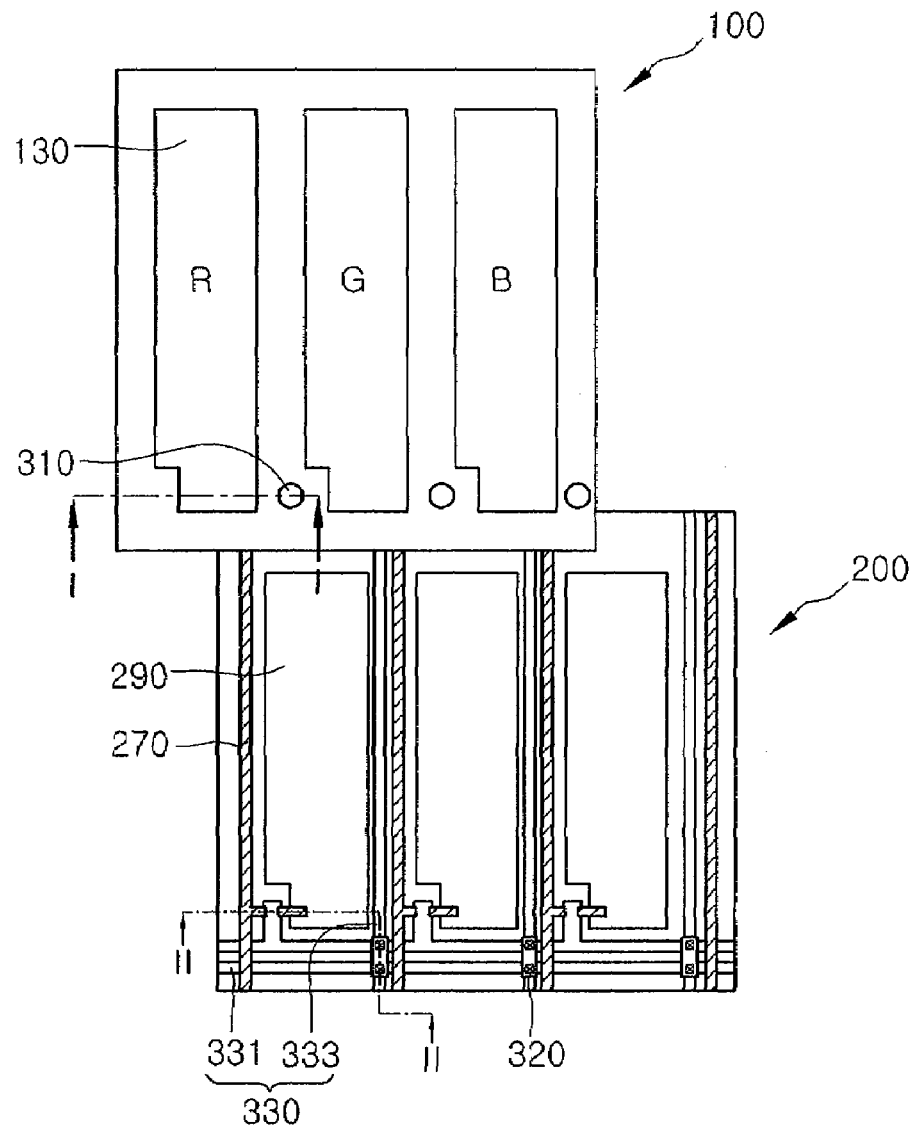
FIG. 5 is a schematic plan view of the LCD panel with a built-in touch screen according to the present invention.

FIG. 5 is a schematic plan view of an LCD panel with a built-in touch screen according to the present invention. FIG. 5 is also a partial plan view illustrating a color filter substrate 100 and a TFT substrate 200 in the LCD panel with a built-in touch screen according to the present invention.

Red, green and blue color filters 130 are formed on a transparent insulative substrate of color filter substrate 100, and a conductive column spacer 310 is disposed on a region between the respective adjacent color filters, i.e. a region of a black matrix. Although a single conductive column spacer 310 is installed at each unit pixel in this embodiment, the number and shape of conductive column spacer 310 may be changed in various ways.

Further, TFT substrate 200 positioned opposite to color filter substrate 100 comprises gate lines 220 which are disposed on the transparent insulative substrate and extend in a first direction to transmit a gate signal, data lines 270 which extend in a second direction and intersect the gate lines 220 in an insulated state, a pixel electrode 290 which is formed in a pixel region defined by the gate and data lines 220 and 270, and a plurality of TFTs which are formed at intersection points of the gate and data lines 220 and 270 in a matrix form and connect with the pixel electrode 290. Furthermore, first and second sensing lines 331 and 333 which are spaced apart from the gate and data lines 220 and 270, respectively, by a predetermined interval are formed on TFT substrate 200.

Conductive pad 320 is formed on a region corresponding to conductive column spacer 310, i.e. on an intersection region of first and second sensing lines 331 and 333, and conductive pad 320 is brought into contact with first and second sensing lines 331 and 333. At this time, conductive pad 320 is formed such that it is spaced apart from conductive column spacer 310 by a predetermined distance when color filter substrate 100 and TFT substrate are bonded with each other.

When the LCD panel with a built-in touch screen so configured is touched, the touch pressure is transmitted to conductive column spacer 310 such that conductive column spacer 310 is brought into contact with the relevant conductive pad 320. Then, the change in resistance, and thus the change in voltage, is produced at a contact position. At this time, the change in voltage is transmitted to the controller 350 through first and second sensing lines 331 and 333, and the controller 350 detects the change in voltage and creates a coordinate corresponding to the change in voltage.

Meanwhile, although conductive pad 320 is formed on the intersection region of first and second sensing lines 331 and 333 in a state where conductive pad is spaced apart from the pixel electrode 290 by a predetermined interval in this embodiment, the present invention is not limited thereto. That is, conductive pad 320 may be formed on a variety of regions, so long as conductive pad is positioned to correspond to conductive column spacer 310.

FIGS. 6A to 6D are sectional views taken along line I-I in the LCD panel shown in FIG. 5 to illustrate a process of manufacturing an example of a color filter substrate in the LCD panel with a built-in touch screen according to the present invention.

Figure 6A:
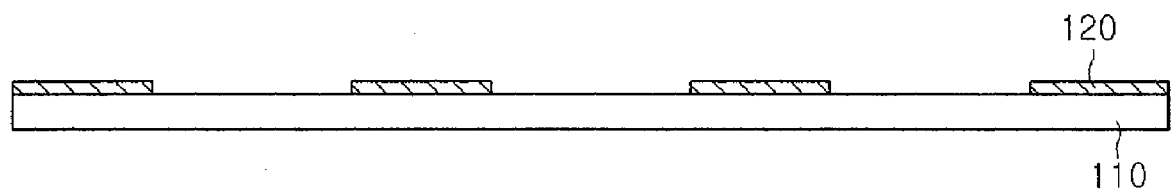
FIGS. 6A to 6D are sectional views illustrating a process of manufacturing an example of a color filter substrate in the LCD panel with a built-in touch screen according to the present invention.

Referring to FIG. 6A, a black matrix 120 is first formed on a transparent insulative substrate 110. At this time, the transparent insulative substrate 110 is generally made of a glass substrate, and the black matrix 120 is formed of a thin film of metal such as Cr or a carbon-based organic material. Further, the black matrix 120 is installed in the vicinity of a boundary of each pixel to separate color filters from one another and simultaneously blocks light transmitted through a liquid crystal cell in a region not controlled by a pixel electrode of a TFT substrate to enhance a contrast ratio of an LCD.

Figure 6B:
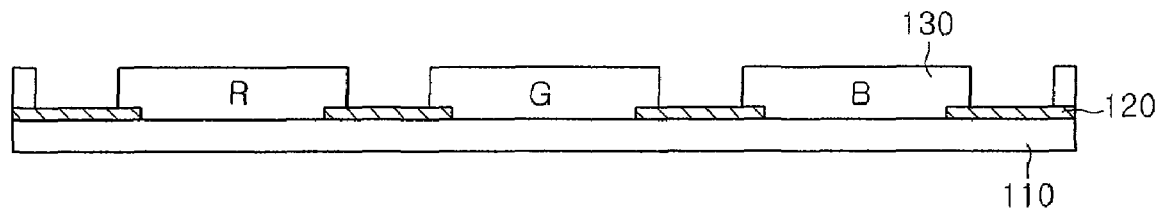

Referring to FIG. 6B, a plurality of color filters 130, e.g. red (R), green (G) and blue (B) color filters, are formed on the substrate 110 with the black matrix 120 formed thereon. A process of forming such color filters 130 will be explained. A negative color photoresist with a red pigment dispersed therein is first applied on a substrate and then light-exposed using a mask. At this time, the mask is configured in such a manner that regions where red color filters will be formed are opened to be light-exposed. Then, if the negative color photoresist is developed using a developing liquid, photoinitiator in the exposed region reacts to form a polymer. Thus, the light-exposed regions are not removed but remain as a pattern during the above developing process, while only the other regions that are not light-exposed are removed. As a result, the red color filters are formed on the substrate, and green and blue color filters are also formed by repeating the aforementioned process.

Figure 6C:
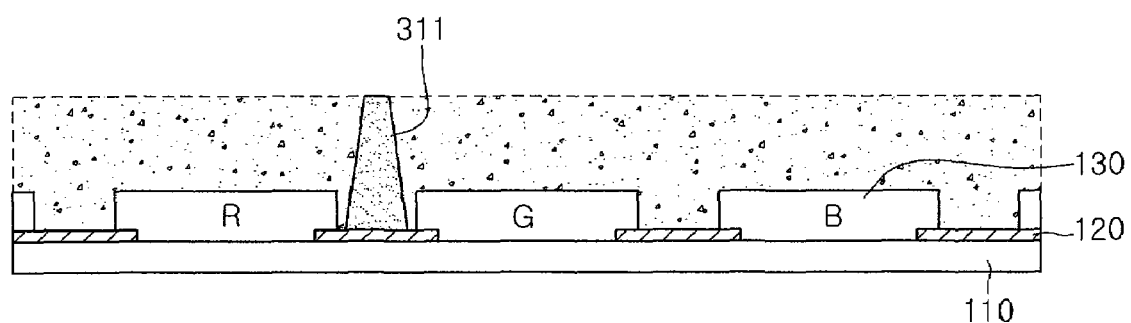

Referring to FIG. 6C, a projection 311 is formed on the black matrix 120 at a predetermined interval. A process of forming the projection 311 will be explained as follows. That is, an organic or inorganic insulation film is first applied on an entire surface of the plurality of color filters 130 and a photolithography process using a mask is then performed to form the projection 311.

Figure 6D:
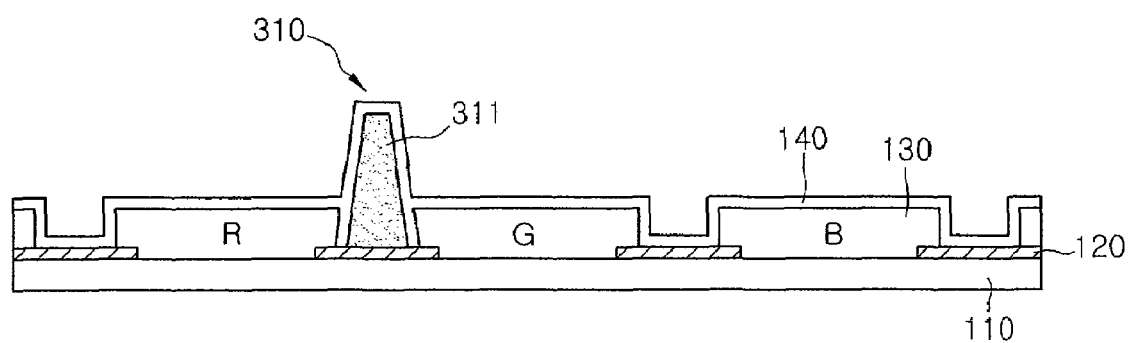

Referring to FIG. 6D, a transparent conductive layer serving as a common electrode 140 is formed on an entire surface of the plurality of color filters 130 and the projection 311 through a sputtering method or the like. At this time, the common electrode 140 may be made of a material such as indium tin oxide (ITO) or indium zinc oxide (IZO). According to the above process of manufacturing color filter substrate, the transparent conductive layer is formed on the projection 311 such that a conductive column spacer 310 can be formed.

In order to obtain good step coverage when forming the common electrode 140, an overcoat film may be formed on the plurality of color filters 130.

Figure 7:
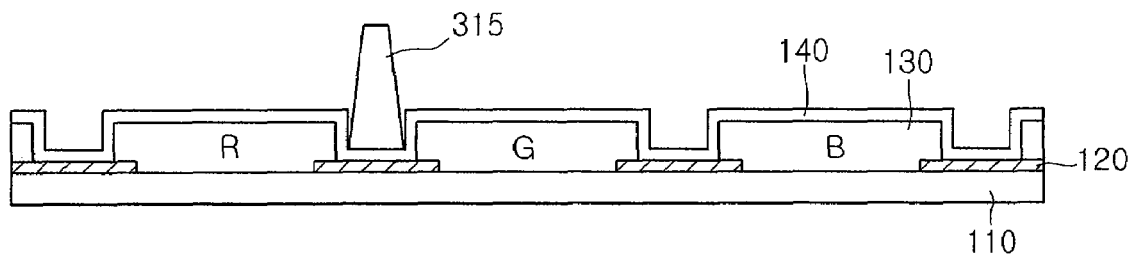
FIG. 7 is a sectional view showing another example of color filter substrate in the LCD panel with a built-in touch screen according to the present invention.

FIG. 7 is a sectional view showing another example of color filter substrate in the LCD panel with a built-in touch screen according to the present invention.

Referring to FIG. 7, color filter substrate comprises a transparent insulative substrate 110, a black matrix 120, a plurality of color filters 130, a conductive column spacer 315 composed of a conductive projection, and a common electrode 140.

The black matrix 120 is formed on the transparent insulative substrate 110, e.g. a glass substrate. The plurality of color filters 130, e.g. red (R), blue (B) and green (G) color filters, are then formed on the substrate with the black matrix formed thereon. Further, a transparent conductive layer serving as the common electrode 140 is formed on an entire surface of the plurality of color filters 130 through a sputtering method, and a projection made of a conductive material, i.e. conductive column spacer 315, is formed on the common electrode 140 at a predetermined interval.

FIGS. 8A to 8E are sectional views taken along line II-II in the LCD panel shown in FIG. 5 to illustrate a process of manufacturing an example of a TFT substrate in the LCD panel with a built-in touch screen according to the present invention.

Figure 8A:
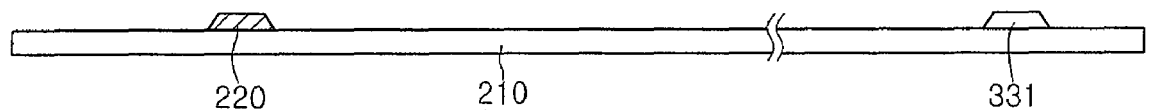
FIGS. 8A to 8E are sectional views illustrating a process of manufacturing an example of a thin film transistor substrate in the LCD panel with a built-in touch screen according to the present invention.

Referring to FIG. 8A, a first conductive film is first formed on a transparent insulative substrate 210. Then, a gate line 220, which includes a gate electrode with a predetermined line width and a storage capacitor electrode (not shown), and a first sensing line 331 are formed through an etching process using a first photoresist mask pattern (not shown).

Figure 8B:
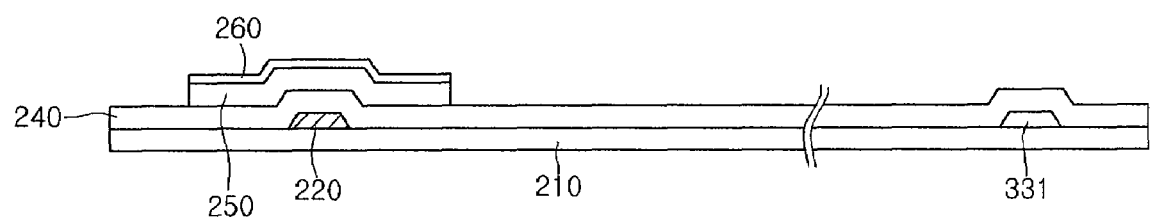

Referring to FIG. 8B, a gate insulation film 240, an active layer 250 and an ohmic contact layer 260 are sequentially formed on an entire surface of the substrate 210 shown in FIG. 8a, and an active region of a TFT is then formed through an etching process using a second photoresist mask pattern (not shown). At this time, the gate insulation film 240 is preferably made of an inorganic insulation material including silicon oxide or silicon nitride. An amorphous silicon layer is used as the active layer 250, and a silicide or amorphous silicon layer heavily doped with N-type impurities is used as the ohmic contact layer 260.

Figure 8C:
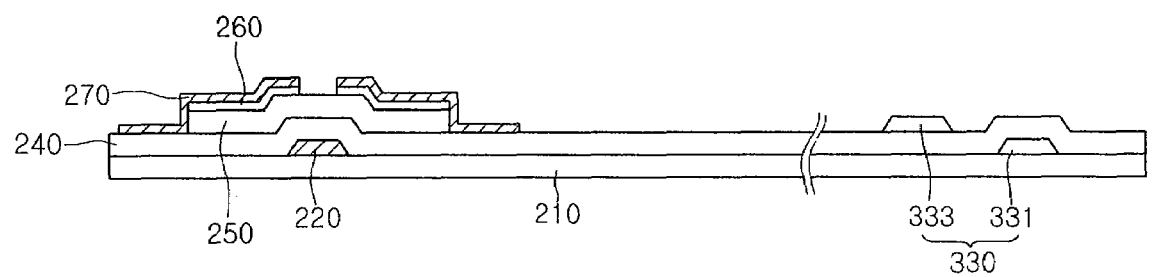

Referring to FIG. 8C, a second conductive film is formed on the entire surface of the substrate 210 with the active region of the TFT formed thereon, and a data line 270 including source and drain electrodes and a second sensing line 333 are then formed through an etching process using a third photoresist mask pattern (not shown).

Figure 8D:
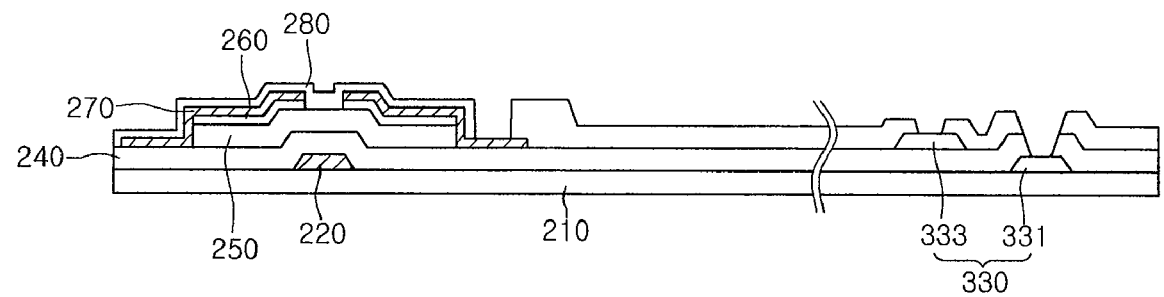

Referring to FIG. 8D, a protection film 280 is formed on the entire surface of the substrate 210 with the TFT and the data line 270 formed thereon, and a portion of the protection film 280 is removed through an etching process using a fourth photoresist mask pattern (not shown) to form a contact hole for bringing the drain electrode into contact with an underlying pixel electrode and to form contact holes for bringing first and second sensing lines 331 and 333 into contact with an underlying conductive pad, respectively.

Figure 8E:
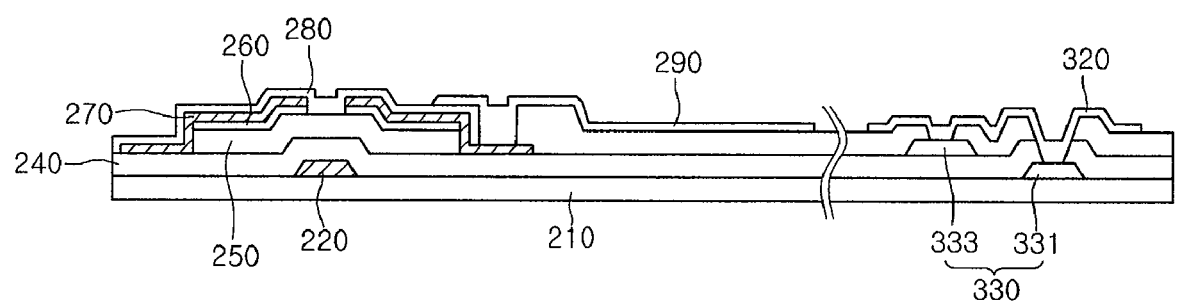

Referring to FIG. 8E, a third conductive film is formed on the protection film 280, and then patterned using a fifth photoresist mask pattern (not shown) to form a pixel electrode 290 and a conductive electrode pad 320. At this time, a transparent conductive film containing ITO or IZO is preferably used as the third conductive film, and conductive electrode pad 320 is formed on an intersection region of first and second sensing lines 331 and 333 in a state where it is spaced apart from the pixel electrode 290 by a predetermined interval.

FIGS. 9A to 11B are views illustrating methods of arranging pressure particles on the LCD panel with a built-in touch screen according to the present invention, respectively.

Figure 9A:
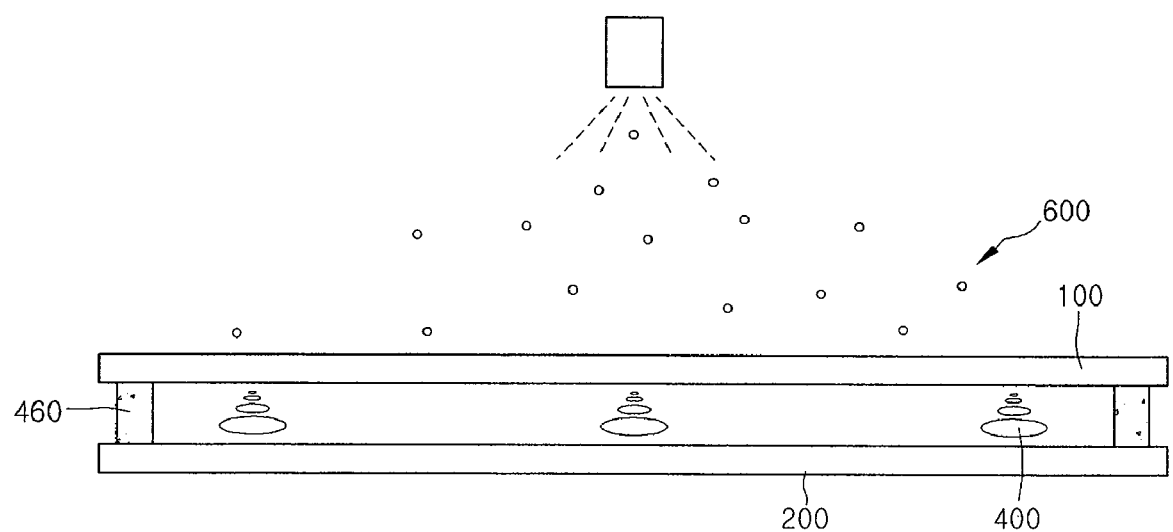
FIGS. 9A to 11B are views illustrating methods of arranging pressure particles on the LCD panel with a built-in touch screen according to the present invention, respectively.
Figure 9B:
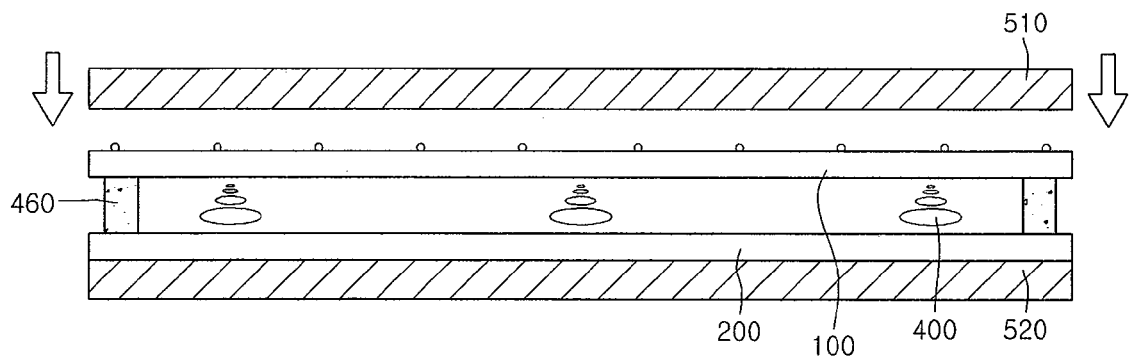

The method shown in FIGS. 9A and 9B will be explained as follows. First, pressure particles 600 are sprayed onto color filter substrate 100 of the LCD panel with a built-in touch screen through a spraying method such that they are dispersed at a predetermined dispersion density (FIG. 9A). At this time, pressure particless 600 may be sprayed in a state where they are mixed with a solvent or using air or nitrogen. Then, the polarizing plates 510 and 520 are attached to the opposite outer surfaces of the LCD panel, respectively (FIG. 9B).

Figure 10A:
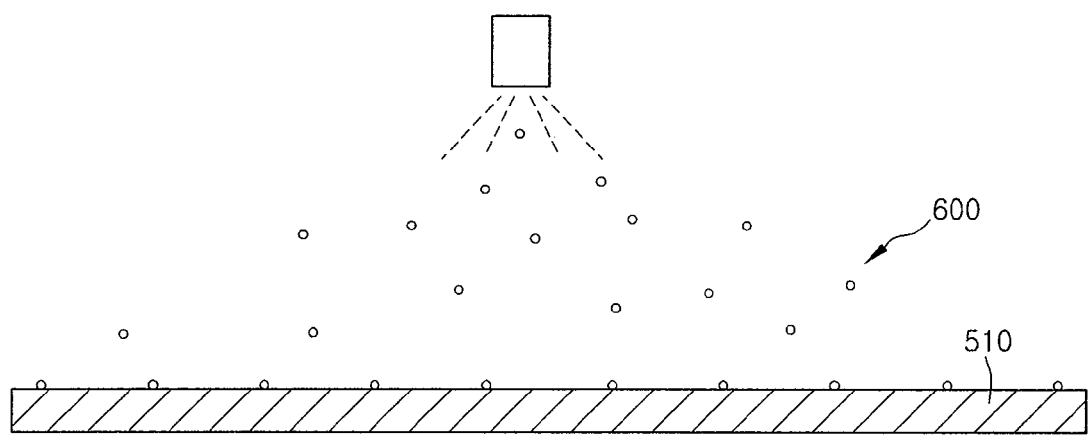
Figure 10B:
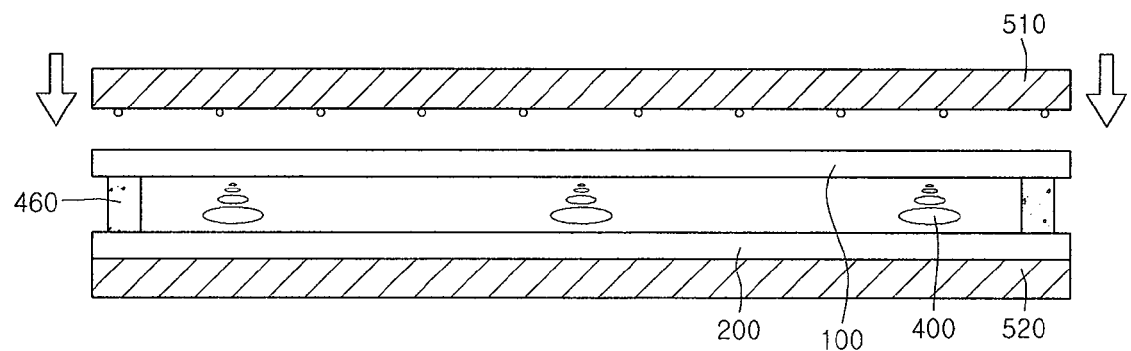

The method shown in FIGS. 10A and 10B will be explained below. Pressure particless 600 are sprayed onto an adhesive layer of first polarizing plate 510 to be attached to an outer surface of the LCD such that they are dispersed at a predetermined dispersion density (FIG. 10A). At this time, pressure particless 600 may be sprayed in a state where they are mixed with a solvent or using air or nitrogen. Then, the polarizing plates 510 and 520 are attached to the opposite outer surfaces of the LCD panel, respectively (FIG. 10B).

Figure 11A:
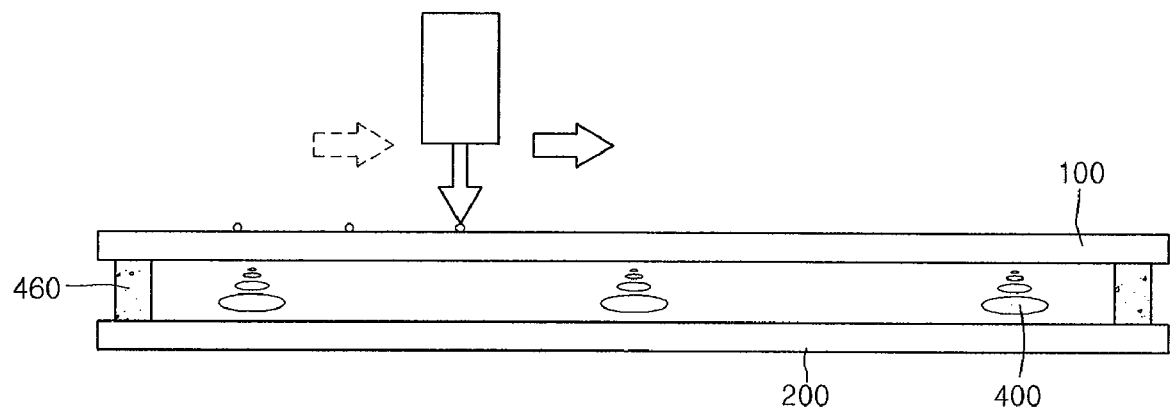
Figure 11B:
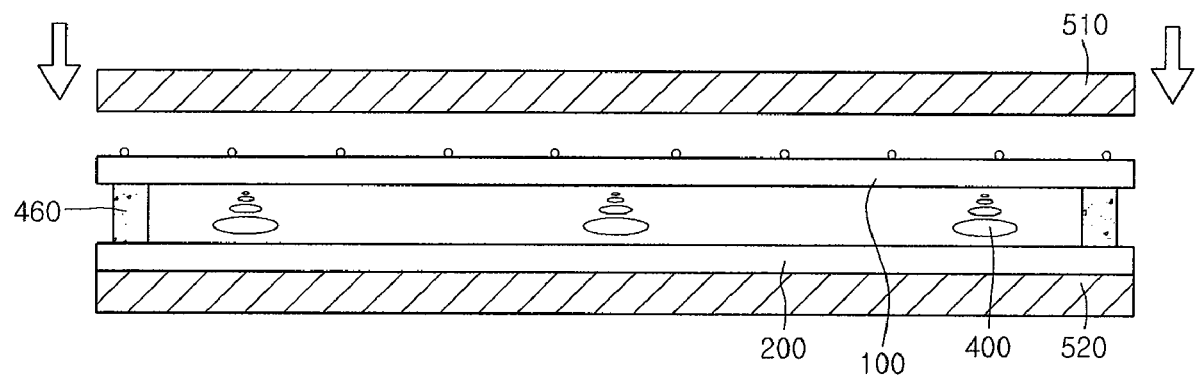

The method shown in FIGS. 11A and 11B will be explained below. First, pressure particless 600 are dropped on a predetermined region of color filter substrate 100, i.e. on an upper region of a conductive column spacer, using a dispenser (FIG. 11A). Then, the polarizing plates 510 and 520 are attached to the opposite outer surfaces of the LCD panel, respectively (FIG. 11B).

Furthermore, to provide light to the aforementioned LCD panel, a backlight including a plurality of optical sheets, a lamp unit, a reflection plate, a light guide plate and the like is positioned below the LCD panel such that an LCD can be implemented.

As described above, an LCD panel with a built-in touch screen according to the present invention, in which pressure particles are disposed, has the following advantage. That is, an application range of touch pressure is concentrated on a local region by means of pressure particles. Thus, even though a soft touch tool having a large contact area with the LCD panel is used on the screen, it achieves substantially same effect as when a hard touch tool having a small contact area is used. As a result, the touch sensitivity can be kept at a certain level regardless of touch circumstances.

The foregoing is merely an exemplary embodiment of an LCD panel with a built-in touch screen and an LCD having the same according to the present invention. Thus, the present invention is not limited thereto. Although the present invention has been described in detail in connection with the preferred embodiment, it will be readily understood by those skilled in the art that various modifications and changes can be made thereto within the technical spirit and scope of the present invention. It is also apparent that the modifications and changes fall within the scope of the present invention defined by the appended claims.

What is claimed is:

1. A liquid crystal display (LCD) panel with a built-in touch screen, comprising:
   a first substrate;
   a second substrate positioned opposite to the first substrate;
   a liquid crystal layer between the first and second substrates;
   a sensing unit positioned between said substrates including a conductive column spacer and a conductive pad spaced apart from the conductive column spacer by a predetermined interval to sense a touch point; and
   a plurality of pressure particles having a predetermined hardness positioned on an outer surface of the first substrate,
   wherein the plurality of pressure particles concentrate outer pressure on the first substrate to actuate the sensing unit with less deformation of the first substrate.

2. The LCD panel as claimed in claim 1, further comprising first and second polarizing plates attached respectively to outer surfaces of the first and second substrates.

3. The LCD panel as claimed in claim 1,
   wherein the conductive column spacer is formed on the first substrate.

4. The LCD panel as claimed in claim 3, wherein the conductive column spacer is formed on the black matrix.

5. The LCD panel as claimed in claim 3, wherein the conductive column spacer comprises a projection including an insulative material and a conductive layer formed on the projection.

6. The LCD panel as claimed in claim 1, wherein the plurality of pressure particles are formed on an area of the first substrate to correspond to the conductive column spacer.

7. The LCD panel as claimed in claim 1, wherein the second substrate comprises:
   a transparent insulative substrate;
   a plurality of thin film transistors formed on the substrate; and
   a plurality of pixel electrodes,
   wherein the conductive pad is formed on the second substrate.

8. The LCD panel as claimed in claim 7, wherein the second substrate further comprises a first sensing line and a second sensing line electrically connected to the conductive pad.

9. The LCD panel as claimed in claim 7, wherein the conductive pad is made of the same material as the pixel electrode.

10. The LCD panel as claimed in claim 1, further comprising a spacer for maintaining a liquid crystal cell gap between the first and second substrates.

11. The LCD panel as claimed in claim 10, wherein the spacer includes a ball spacer or column spacer.

12. The LCD panel as claimed in claim 1, wherein the pressure particles are in the form of a ball.

13. The LCD panel as claimed in claim 1, wherein the size of the pressure particles is 1 to 100 µm.

14. The LCD panel as claimed in claim 1, wherein the pressure particles comprise a transparent material.

15. The LCD panel as claimed in claim 1, wherein the plurality of pressure particles are dropped at positions corresponding to the conductive column spacer and the conductive pad.

16. The LCD panel as claimed in claim 1, wherein the plurality of pressure particles are dispersed on the outer surface of first substrate at a predetermined dispersion density.

17. The LCD panel as claimed in claim 2, wherein the plurality of pressure particles are dispersed on an adhesive layer of the first polarizing plate at a predetermined dispersion density.

18. The LCD panel as claimed in claim 1, further comprising:
   a controller for receiving a signal from the sensing unit to detect a voltage change and to create a coordinate of a touch point; and
   a driver for receiving the coordinate from the controller to operate a pointer.

19. An LCD, comprising:
   an LCD panel with a built-in touch screen including a first substrate, a second substrate positioned opposite to the first substrate, a liquid crystal layer interposed between the first and the second substrates, a sensing unit positioned between said substrates including a conductive column spacer and a conductive pad spaced apart from the conductive column spacer by a predetermined interval to sense a touch point, and a plurality of pressure particles with a certain hardness positioned on an outer surface of the first substrate; and
   a backlight for providing light to the LCD panel,
   wherein the plurality of pressure particles concentrate outer pressure on the first substrate to actuate the sensing unit with less deformation of the first substrate.

20. A liquid crystal display (LCD) panel with a built-in touch screen, comprising:
   a first substrate, which is deformable under finger pressure;
   a second substrate positioned opposite to the first substrate;
   a liquid crystal layer between the first and second substrates;
   a sensing unit positioned between said substrates for responding to the deformation of said first substrate; and
   a plurality of pressure particles positioned on an outer surface of one of said substrates for concentrating said finger pressure to actuate said sensing unit with less deformation of said first substrate.

* * * * *